(12) United States Patent
Matsumura et al.

(10) Patent No.: US 12,476,750 B2
(45) Date of Patent: Nov. 18, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 387 days.

(21) Appl. No.: 18/041,740

(22) PCT Filed: Aug. 17, 2021

(86) PCT No.: PCT/JP2021/030020
§ 371 (c)(1),
(2) Date: Feb. 15, 2023

(87) PCT Pub. No.: WO2022/039153
PCT Pub. Date: Feb. 24, 2022

(65) Prior Publication Data
US 2023/0299901 A1    Sep. 21, 2023

(30) Foreign Application Priority Data
Aug. 18, 2020    (JP) .................................. 2020-138092

(51) Int. Cl.
*H04L 5/00*    (2006.01)
(52) U.S. Cl.
CPC .......... *H04L 5/0035* (2013.01); *H04L 5/0091* (2013.01)
(58) Field of Classification Search
CPC ........................... H04L 5/0091; H04L 5/0035
See application file for complete search history.

(56) References Cited

U.S. PATENT DOCUMENTS

2023/0134318 A1* 5/2023 Kang .................... H04W 16/28
                                                      370/329
2023/0318761 A1* 10/2023 Jang ..................... H04L 5/0035
                                                      370/329

OTHER PUBLICATIONS

International Search Report issued in PCT/JP2021/030020 on Nov. 2, 2021 (1 page).
Written Opinion of the International Searching Authority issued in PCT/JP2021/030020 on Nov. 2, 2021 (3 pages).
Moderator (LG Electronics); "Summary#1 of email thread [102-e-NR-eMIMO-02]"; 3GPP TSG RAN WG1 #102-e, R1-2007007; e-Meeting; Aug. 17-28, 2020 (6 pages).

(Continued)

*Primary Examiner* — Derrick V Rose
(74) *Attorney, Agent, or Firm* — Osha Bergman Watanabe & Burton LLP

(57) ABSTRACT

A terminal according to an aspect of the present disclosure includes a receiving section that receives a list of a plurality of serving cells, and receives, for one serving cell of the plurality of serving cells, a medium access control-control element (MAC CE) used for activation of a TCI state for a physical downlink shared channel, and a control section that, when the plurality of serving cells include one or more specific serving cells in which at least one transmission configuration indication (TCI) code point is mapped to two transmission configuration indication (TCI) states, maps one or more TCI state IDs indicated by the MAC CE to a TCI code point of one or more serving cells of the plurality of serving cells. According to an aspect of the present disclosure, TCI states can be appropriately updated.

5 Claims, 9 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 #102-e; R1-2005976 "Text Proposals for Multi-beam Operation Enhancement" OPPO; e-Meeting; Aug. 17-28, 2020 (7 pages).
Office Action issued in Japanese Application No. 2022-543951; Dated Jan. 9, 2024 (7 pages).

\* cited by examiner

Enhanced TCI States Activation/Deactivation for UE-specific PDSCH MAC CE

| R | Serving Cell ID | BWP ID | Oct. 1 |
|---|---|---|---|
| $C_0$ | TCI state $ID_{0,1}$ | | Oct. 2 |
| R | TCI state $ID_{0,2}$ | | Oct. 3 (Optional) |

...

| $C_N$ | TCI state $ID_{N,1}$ | Oct. M-1 |
|---|---|---|
| R | TCI state $ID_{N,2}$ | Oct. M (Optional) |

FIG. 3

| CC list | |
|---|---|
| CC#0 | EACH TCI CODE POINT IS MAPPED TO ONE TCI STATE |
| CC#1 | EACH TCI CODE POINT IS MAPPED TO ONE TCI STATE |
| CC#2 | EACH TCI CODE POINT IS MAPPED TO ONE TCI STATE |
| CC#3 | EACH TCI CODE POINT IS MAPPED TO ONE TCI STATE |

FIG. 4

| CC list | |
|---|---|
| CC#0 | EACH TCI CODE POINT IS MAPPED TO ONE TCI STATE |
| CC#1 | AT LEAST ONE TCI CODE POINT IS MAPPED TO TWO TCI STATES |
| CC#2 | EACH TCI CODE POINT IS MAPPED TO ONE TCI STATE |
| CC#3 | EACH TCI CODE POINT IS MAPPED TO ONE TCI STATE |

FIG. 5

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), simultaneously updating transmission control indication (TCI) states simultaneously for a plurality of component carriers (CCs, cells) has been under study.

However, when at least one of the plurality of CCs uses at least one transmission/reception point (TRP), how to update the TCI states has not been made clear. Unless a method of updating the TCI states is made clear, reduction in throughput, reduction in communication quality, and the like may be caused.

In view of this, the present disclosure has one object to provide a terminal, a radio communication method, and a base station for appropriately updating TCI states.

Solution to Problem

A terminal according to an aspect of the present disclosure includes a receiving section that receives a list of a plurality of serving cells, and receives, for one serving cell of the plurality of serving cells, a medium access control-control element (MAC CE) used for activation of a TCI state for a physical downlink shared channel, and a control section that, when the plurality of serving cells include one or more specific serving cells in which at least one transmission configuration indication (TCI) code point is mapped to two transmission configuration indication (TCI) states, maps one or more TCI state IDs indicated by the MAC CE to a TCI code point of one or more serving cells of the plurality of serving cells.

Advantageous Effects of Invention

According to an aspect of the present disclosure, TCI states can be appropriately updated.

BRIEF DESCRIPTION OF DRAWINGS

FIG. 3 is a diagram to show an example of an Enhanced TCI States Activation/Deactivation for UE-specific PDSCH MAC CE;

FIG. 4 is a diagram to show an example of a CC list according to a first embodiment;

FIG. 5 is a diagram to show an example of a CC list according to a second embodiment;

Figure 1:
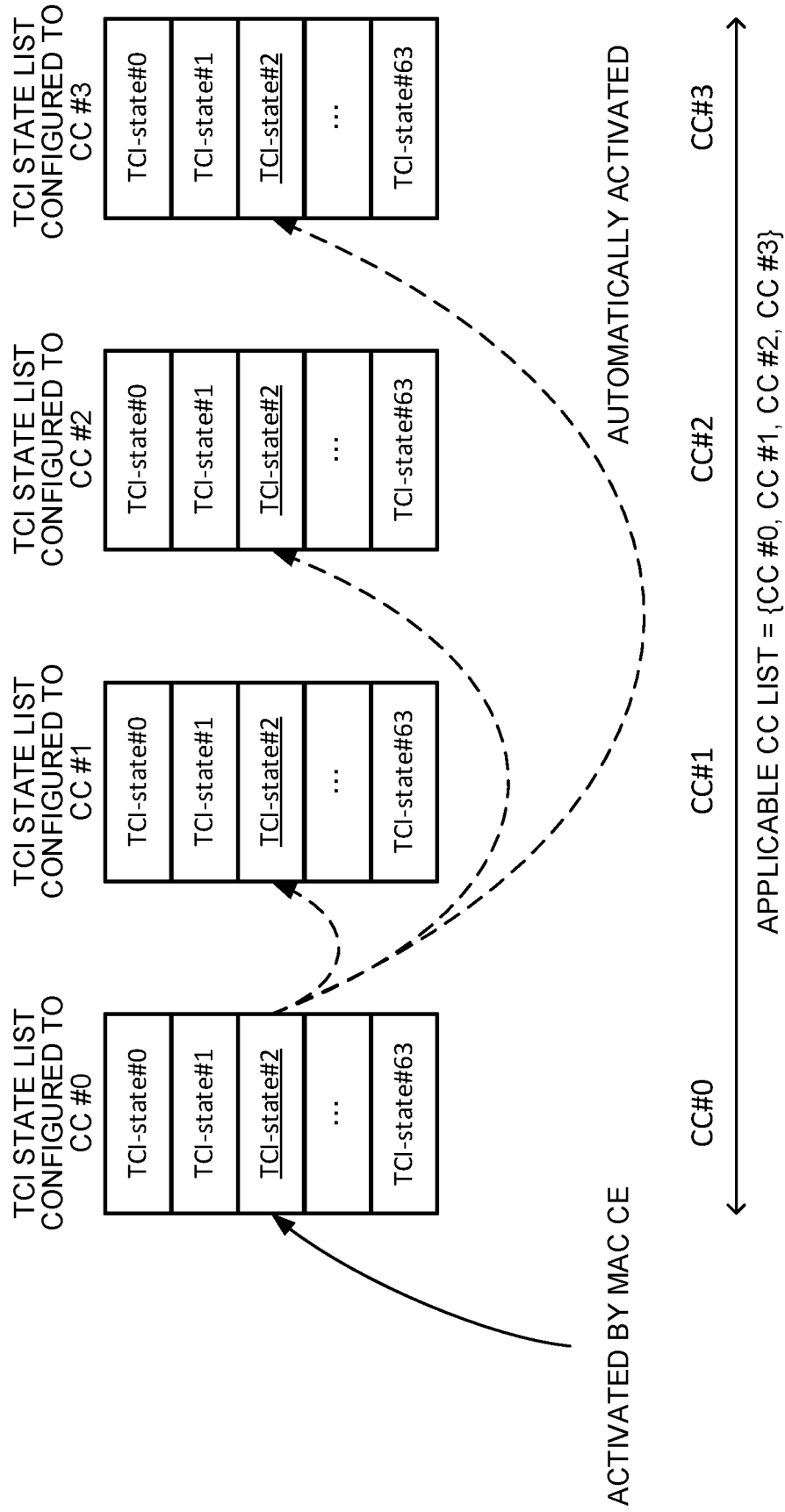
FIG. 1 is a diagram to show an example of simultaneous beam update of a plurality of CCs.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is referred to as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS for QCL type X for the TCI state may mean the RS in the QCL type X relation with (the DMRS for) a certain channel/signal, and the RS may be referred to as a QCL source of the QCL type X for the TCI state.

(Multi TRP)

For NR, a scheme in which one or a plurality of transmission/reception points (TRPs) (multi TRP (MTRP)) perform DL transmission to the UE by using one or a plurality of panels (multi panel) has been under study. A scheme in which the UE performs UL transmission to one or a plurality of TRPs by using one or a plurality of panels has been under study.

Note that the plurality of TRPs may correspond to the same cell identifier (ID), or may correspond to different cell IDs. The cell ID may be a physical cell ID, or may be a virtual cell ID.

The multi TRP (for example, TRPs #1 and #2) are connected with an ideal/non-ideal backhaul, and information, data, and the like may be exchanged therebetween. Different code words (CWs) and different layers may be transmitted from respective TRPs of the multi TRP. As one mode of multi TRP transmission, non-coherent joint transmission (NCJT) may be used.

In NCJT, for example, TRP #1 performs modulation mapping of a first code word and performs layer mapping so as to transmit a first PDSCH by using first precoding for a first number of layers (for example, two layers). TRP #2 performs modulation mapping of a second code word and performs layer mapping so as to transmit a second PDSCH by using second precoding for a second number of layers (for example, two layers).

Note that it may be defined that a plurality of PDSCHs (multi PDSCH) subjected to NCJT partially or entirely overlap in at least one of time and frequency domains. In other words, at least one of the time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multi PDSCH may be interpreted as simultaneous reception of PDSCHs that are not of a certain QCL type (for example, QCL type D).

The plurality of PDSCHs (which may be referred to as multi PDSCH (multiple PDSCH)) from the multi TRP may be scheduled using one piece of DCI (single DCI, single PDCCH) (single master mode, single-DCI based multi-TRP). The plurality of PDSCHs from the multi TRP may be scheduled using a plurality of pieces of DCI (a plurality of DCI, multi DCI, multi PDCCH (multiple PDCCH)) (multi master mode, multi-DCI based multi-TRP).

According to the multi TRP scenario as described above, more flexible transmission control using a channel having satisfactory quality can be performed.

In order to support multi TRP transmission within a cell ("intra-cell", having the same cell ID) and among cells ("inter-cell", having different cell IDs) based on a plurality of PDCCHs, in RRC configuration information for linking a plurality of pairs of PDCCHs and PDSCHs having a plurality of TRPs, one control resource set (CORESET) in PDCCH configuration information (PDCCH-Config) may correspond to one TRP.

(Simultaneous Beam Update in Plurality of CCs)

In Rel. 16, one MAC CE can update beam indexes (TCI states) of a plurality of CCs.

The UE can be configured with up to two applicable CC lists (for example, applicable-CC-list) by RRC. When two applicable CC lists are configured, the two applicable CC lists may respectively correspond to intra-band CA in FR1 and intra-band CA in FR2.

An activation MAC CE of a TCI state of a PDCCH activates a TCI state associated with the same CORESET ID in all of the BWPs/CCs in the applicable CC list.

An activation MAC CE of a TCI state of a PDSCH activates a TCI state in all of the BWPs/CCs in the applicable CC list.

An activation MAC CE of spatial relation of an A-SRS/SP-SRS activates spatial relation associated with the same SRS resource ID in all of the BWPs/CCs in the applicable CC list.

In the example of FIG. 1, the UE is configured with the applicable CC list indicating CCs #0, #1, #2, and #3 and a list indicating 64 TCI states for the CORESET or the PDSCH of each of the CCs. When one TCI state of CC #0 is activated by the MAC CE, corresponding TCI states are activated in CCs #1, #2, and #3.

A scheme in which such simultaneous beam update can be applied only to a single TRP case has been under study.

For the PDSCH, the UE may be based on the following procedure A.

[Procedure A]

The UE receives an activation command for mapping up to eight TCI states to code points of a DCI field (TCI field) in one CC/DL BWP or in one set of CCs/BWPs. When one set of TCI state IDs is activated for one set of CCs/DL BWPs, a CC applicable list is then determined by the CCs indicated in the activation command, and the same set of TCI states is applied to all of the DL BWPs in the indicated CCs. Only if the UE is not provided with a plurality of different values of CORESET pool indexes (CORESET-PoolIndex) in a CORESET information element (ControlResourceSet), and is not provided with at least one TCI code point to be mapped to two TCI states, one set of TCI state IDs can be activated for one set of CCs/DL BWPs.

For the PDCCH, the UE may be based on the following procedure B.

[Procedure B]

If the UE is provided with up to two lists of cells for simultaneous TCI state activation using a simultaneous TCI update list (at least one of simultaneousTCI-UpdateList-r16 and simultaneousTCI-UpdateListSecond-r16) by a simultaneous TCI cell list (simultaneousTCI-CellList), the UE applies antenna port quasi co-location (QCL) provided by the TCI states having the same activated TCI state ID value to the CORESET having an index p in all of configured DL BWPs in all of configured cells in one list determined based on a serving cell index provided by a MAC CE command. Only if the UE is not provided with a plurality of different values of CORESET pool indexes (CORESETPoolIndex) in the CORESET information element (ControlResourceSet), and is not provided with at least one TCI code point to be mapped to two TCI states, the simultaneous TCI cell list can be provided for simultaneous TCI state activation.

For a semi-persistent (SP)/aperiodic (AP)-SRS, the UE may be based on the following procedure C.

[Procedure C]

When spatial relation information (spatialRelationInfo) for SP or AP-SRS resources configured by an SRS resource information element (higher layer parameter SRS-Resource) is activated/updated for one set of CCs/BWPs by the MAC CE, the CC applicable list is then indicated by a simultaneous spatial update list (higher layer parameter simultaneousSpatial-UpdateList-r16 or simultaneousSpatial-UpdateListSecond-r16), and the spatial relation information is applied to the SP or AP-SRS resources having the same SRS resources ID in all of BWPs in the indicated CCs. Only if the UE is not provided with a plurality of different values of CORESET pool indexes (CORESETPoolIndex) in the CORESET information element (ControlResourceSet), and is not provided with at least one TCI code point to be mapped to two TCI states, the spatial relation information (spatialRelationInfo) for the SP or AP-SRS resources configured by the SRS resource information element (higher layer parameter SRS-Resource) is activated/updated for one set of CCs/BWPs by the MAC CE.

The simultaneous TCI cell list (simultaneousTCI-CellList) and the simultaneous TCI update list (at least one of simultaneousTCI-UpdateList1-r16 and simultaneousTCI-UpdateList2-r16) are lists of serving cells with which a TCI relationship can be simultaneously updated using the MAC CE. simultaneousTCI-UpdateList1-r16 and simultaneousTCI-UpdateList2-r16 do not include the same serving cell.

The simultaneous spatial update list (at least one of higher layer parameters simultaneousSpatial-UpdatedList1-r16 and simultaneousSpatial-UpdatedList2-r16) is a list of serving cells with which the spatial relation can be simultaneously updated using the MAC CE. simultaneousSpatial-UpdatedList1-r16 and simultaneousSpatial-UpdatedList2-r16 do not include the same serving cell.

Here, the simultaneous TCI update list and the simultaneous spatial update list are configured by RRC, the CORESET pool index of the CORESET is configured by RRC, and the TCI code point to be mapped to the TCI state is indicated by the MAC CE.

Figure 2:
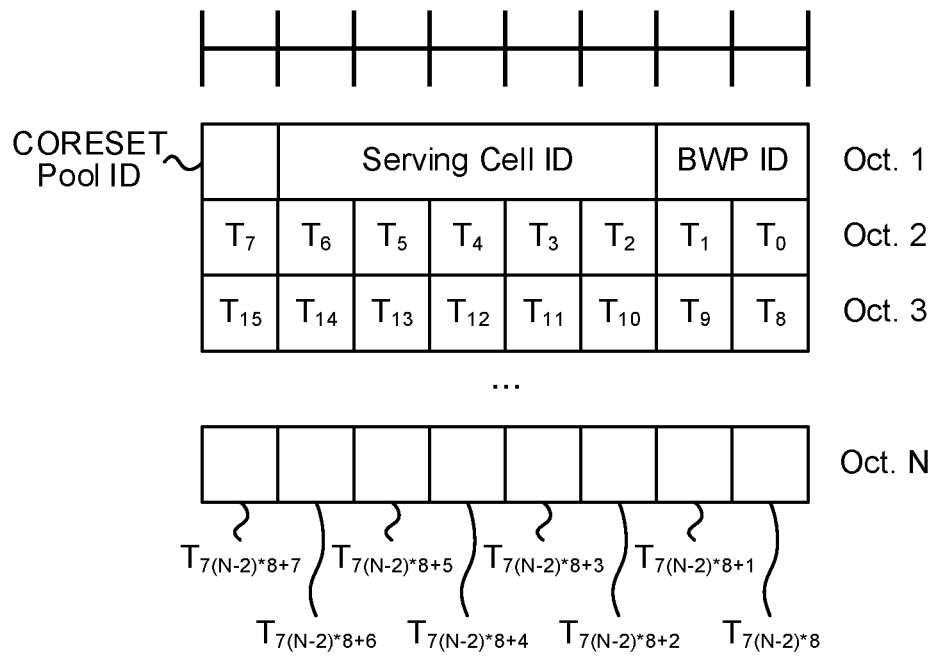
FIG. 2 is a diagram to show an example of a TCI States Activation/Deactivation for UE-specific PDSCH MAC CE.

A TCI States Activation/Deactivation for UE-specific PDSCH MAC CE (first MAC CE, PDSCH TCI MAC CE) of FIG. 2 includes a CORESET pool ID field, a serving cell ID field, a BWP ID field, and a $T_i$ field.

When the $T_i$ field is set to 1, it is indicated that the TCI state having TCI state ID i is activated and is mapped to a code point of the TCI field of the DCI. The code point to which the TCI state is mapped is determined by the position indicating order in all of the TCI states with the $T_i$ field being set to 1. A CORESET pool ID indicates that mapping between the activated TCI state and the code point of the TCI of the DCI set by the $T_i$ field is specific to the CORESET configured with the CORESET pool ID.

If the serving cell indicated by the MAC CE (serving cell ID field) is configured as a part of the simultaneous TCI update list (simultaneousTCI-UpdateList1-r16 or simultaneousTCI-UpdateList2-r16), the MAC CE is applied to all of the serving cells configured in the simultaneous TCI update list.

The first MAC CE can activate one TCI state per TCI code point. The MAC CE may be used for PDSCH reception of multi TRP based on the multi DCI and PDSCH reception of single TRP.

An Enhanced TCI States Activation/Deactivation for UE-specific PDSCH MAC CE (second MAC CE, enhanced PDSCH TCI MAC CE) of FIG. 3 includes a reserved (R) field (reserved bit), a serving cell ID field, a BWP ID field, a $C_1$ field, and a TCI state $ID_{i,j}$ field.

The $C_i$ field indicates whether there is an octet including a TCI state $ID_{i,2}$ field. The TCI state $ID_{i,j}$ field indicates a j-th TCI state that is indicated for an i-th code point in the TCI field of the DCI. The TCI code point to which the TCI state is mapped is determined by the position indicating order in all of the TCI code points with a set of TCI state $ID_{i,j}$ fields.

The second MAC CE can activate one or two TCI states per TCI code point. The MAC CE is mainly for the multi TRP based on the single DCI; however, if up to one TCI state is activated for any of the TCI code points, the MAC CE may be used for the single TRP or the multi TRP based on the multi DCI.

A TCI State Indication for UE-specific PDCCH MAC CE includes a serving cell ID, a CORESET ID, and a TCI state ID. The TCI state ID indicates a TCI state that can be applied to the CORESET identified by the CORESET ID. If the serving cell indicated by the MAC CE is configured as a part of the simultaneous TCI update list, the MAC CE is applied to the serving cell configured in the simultaneous TCI update list.

In the single TRP, the TCI states of the PDCCH include one active TCI state. The TCI states of the PDSCH include up to eight active TCI states (which are activated by the MAC CE and are to be mapped to the code points of the DCI). Each of the DCI code points (indicated by the TCI field in the DCI) corresponds to one active TCI state.

In the multi TRP based on the single DCI, the TCI states of the PDCCH include one active TCI state. The TCI states of the PDSCH include up to eight active TCI states (which are activated by the MAC CE and are to be mapped to the code points of the DCI). Each of the DCI code points (indicated by the TCI field in the DCI) corresponds to one or two active TCI states.

In the multi TRP based on the multi DCI, the TCI states of the PDCCH include one active TCI state. The CORESET pool index is configured for each CORESET. For each TRP, the TCI states of the PDSCH include up to eight active TCI states (which are activated by the MAC CE and are to be mapped to the code points of the DCI). Each of the DCI code points (indicated by the TCI field in the DCI) corresponds to one active TCI state.

A scheme has been under study in which the TCI state configured for the PDSCH of one serving cell or a set of serving cells configured in the simultaneous TCI update list (simultaneousTCI-UpdateList1-r16 or simultaneousTCI-UpdateList2-r16) may be activated/deactivated by a network transmitting the first MAC CE. A scheme has been under study in which the TCI state configured for the code point of the TCI field of the DCI for the PDSCH of one serving cell may be activated/deactivated by a network transmitting the second MAC CE.

Regarding the multi TRP based on the single DCI and PDSCH TCI update in a plurality of CCs, the following cases 1 and 2 have been under study.

[Case 1]

The CC list includes a CC/BWP in which at least one TCI code point is mapped to two TCI states.

[Case 2]

The CC list includes a CC/BWP in which two CORESET pools are configured.

However, operation of simultaneous TCI update for the PDSCH in a plurality of CCs including a CC using a plurality of TRPs has not been made clear. Unless the operation is made clear, increase in overhead, reduction in throughput, reduction in communication quality, and the like may be caused.

In view of this, the inventors of the present invention came up with the idea of a method of updating TCI states.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted as each other. In the present disclosure, a cell, a CC, a carrier, a BWP, a DL BWP, a UL BWP, an active DL BWP, an active UL BWP, and a band may be interchangeably interpreted as each other. In the present disclosure, an index, an ID, an indicator, and a resource ID may be interchangeably interpreted as each other. In the present disclosure, an RRC parameter, a higher layer parameter, an RRC information element (IE), and an RRC message may be interchangeably interpreted as each other.

In the present disclosure, activate, update, indicate, enable, and specify may be interchangeably interpreted as each other.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a TCI state, QCL assumption, a QCL parameter, a spatial domain reception filter, a UE spatial domain reception filter, a UE receive beam, a DL receive beam, DL precoding, a DL precoder, a DL-RS, QCL type D of a TCI state, an RS of QCL type D of a TCI state, an RS of QCL type D of a TCI state or QCL assumption, an RS of QCL type A of a TCI state or QCL assumption, spatial relation, a spatial domain transmission filter, a UE spatial domain transmission filter, a UE transmit beam, a UL transmit beam, UL precoding, and a UL precoder may be interchangeably interpreted as each other. In the present disclosure, a QCL type X-RS, a DL-RS associated with QCL type X, a DL-RS having QCL type X, a source of a DL-RS, an SSB, and a CSI-RS may be interchangeably interpreted as each other.

In the present disclosure, a panel, an Uplink (UL) transmission entity, a TRP, a spatial relation, a control resource set (CORESET), a PDSCH, a code word, a base station, an antenna port of a certain signal (for example, a demodulation reference signal (DMRS) port), an antenna port group of a certain signal (for example, a DMRS port group), a group for multiplexing (for example, a code division multiplexing (CDM) group, a reference signal group, a CORESET group), a CORESET pool, a CW, a redundancy version (RV), and a layer (a MIMO layer, a transmission layer, a spatial layer) may be interchangeably interpreted as each other. A panel Identifier (ID) and a panel may be interchangeably interpreted as each other. In the present disclosure, a TRP ID and a TRP may be interchangeably interpreted as each other.

In the present disclosure, the UE configured with a plurality of TRPs may determine at least one of the TRP corresponding to the DCI, the TRP corresponding to the PDSCH or UL transmission (the PUCCH, the PUSCH, the SRS, or the like) scheduled by the DCI, and the like, based on at least one of the following.

Value in a certain field (for example, a field for indicating the TRP, an antenna port field, a PRI) included in the DCI DMRS (for example, a sequence of the DMRS, resources thereof, a CDM group, a DMRS port, a DMRS port group, an antenna port group, or the like) corresponding to the scheduled PDSCH/PUSCH DMRS (for example, a sequence of the DMRS, resources thereof, a CDM group, a DMRS port, a DMRS port group, or the like) corresponding to the PDCCH on which the DCI is transmitted CORESET (for example, a CORESET pool ID of the CORESET, an ID of the CORESET, a scrambling ID (which may be interpreted as a sequence ID), resources thereof, or the like) in which the DCI is received RS (RS related group or the like) used for the TCI state, the QCL assumption, the spatial relation information, or the like In the present disclosure, the single PDCCH (DCI) may be referred to as a PDCCH (DCI) of a first scheduling type (for example, scheduling type A (or type 1)). The multi PDCCH (DCI) may be referred to as a PDCCH (DCI) of a second scheduling type (for example, scheduling type B (or type 2)).

In the present disclosure, it may be assumed that the single PDCCH is supported when the multi TRP uses the ideal backhaul. It may be assumed that the multi PDCCH is supported when the non-ideal backhaul is used between the multi TRPs.

Note that the ideal backhaul may be referred to as DMRS port group type 1, reference signal related group type 1, antenna port group type 1, CORESET pool type 1, or the like. The non-ideal backhaul may be referred to as DMRS port group type 2, reference signal related group type 2, antenna port group type 2, CORESET pool type 2, or the like. Terms are not limited to these.

In the present disclosure, a single TRP, a single TRP system, single TRP transmission, and a single PDSCH may be interchangeably interpreted as each other. In the present disclosure, a multi TRP, a multi TRP system, multi TRP transmission, and a multi PDSCH may be interchangeably interpreted as each other. In the present disclosure, single DCI, a single PDCCH, a multi TRP based on single DCI, and activation of two TCI states in at least one TCI code point may be interchangeably interpreted as each other.

In the present disclosure, the single TRP may be interpreted as a case in which the UE is not provided with a plurality of different values of CORESET pool indexes (CORESETPoolIndex) in the CORESET information element (ControlResourceSet) and is not provided with at least one TCI code point to be mapped to two TCI states in any of the indicated CCs.

In the present disclosure, the multi TRP based on the single DCI may be interchangeably interpreted as a case in which the UE is provided with a plurality of different values of CORESET pool indexes (CORESETPoolIndex) in the CORESET information element (ControlResourceSet) and is provided with at least one TCI code point to be mapped to two TCI states in any of the indicated CCs.

In the present disclosure, the multi TRP based on the multi DCI may be interchangeably interpreted as a case in which the UE is provided with a plurality of different values of CORESET pool indexes (CORESETPoolIndex) in the CORESET information element (ControlResourceSet) and is not provided with at least one TCI code point to be mapped to two TCI states in any of the indicated CCs.

In the present disclosure, a TCI code point, a DCI code point, and a code point of a TCI field may be interchangeably interpreted as each other. In the present disclosure, a TCI field and a DCI field "transmission configuration indication" may be interchangeably interpreted as each other.

In the present disclosure, a CC list, a CC list in a cell group configuration (CellGroupConfig), an applicable list, a simultaneous TCI update list/a second simultaneous TCI update list, simultaneousTCI-UpdateList1-r16/simultaneousTCI-UpdateList2-r16, a simultaneous TCI cell list, simultaneousTCI-CellList, a simultaneous spatial update list/a second simultaneous spatial update list, simultaneousSpatial-UpdatedList1-r16/simultaneousSpatial-UpdatedList2-r16, a configured CC, a configured list, a BWP/CC in a configured list, all of BWPs/CCs in a configured list, a CC indicated by an activation command, an indicated CC, a CC in which a MAC CE is received, and information indicating a plurality of cells for update of at least one of a TCI state and a spatial relation may be interchangeably interpreted as each other.

In the present disclosure, a MAC CE and an activation command may be interchangeably interpreted as each other.

In the present disclosure, a serving cell configured with a multi TRP based on single DCI, a serving cell using an "Enhanced TCI States Activation/Deactivation for UE-specific PDSCH MAC CE", a serving cell including a code point of a DCI field "transmission configuration indication" (TCI) indicating one or two TCI states, a serving cell of a multi TRP based on single DCI, and a serving cell using a multi TRP based on single DCI may be interchangeably interpreted as each other.

In the present disclosure, a serving cell configured with single TRP transmission, a serving cell for single cell PDSCH transmission of Rel. 15, a serving cell in which only one TCI state is indicated for each code point of a TCI field in DCI, and a serving cell in which only one TCI state is indicated for each code point of a TCI field in DCI and CORESET pool index 1 is not configured may be interchangeably interpreted as each other.

In the present disclosure, application of a MAC CE to a certain serving cell and application of a MAC CE to all of BWPs in a certain serving cell may be interchangeably interpreted as each other.

(Radio Communication Method)

First Embodiment

In the CC list for simultaneous TCI update across a plurality of CCs, the serving cell configured with the multi TRP based on the single DCI is not configured.

In the example of FIG. 4, in all of CCs (serving cells) included in the CC list, each TCI code point is mapped to one TCI state.

According to the first embodiment described above, simultaneous TCI update across a plurality of CCs is appropriately performed.

Second Embodiment

In the CC list for simultaneous TCI update across a plurality of CCs, a serving cell configured with the multi TRP based on the single DCI may be configured (may be included).

In the example of FIG. 5, in at least one CC (serving cell) included in the CC list, at least one TCI code point is mapped to two TCI states.

<<Problem 2-1>>

When a serving cell configured with the multi TRP based on the single DCI is configured in the CC list, whether the UE assumes reception of the "Enhanced TCI States Activation/Deactivation for UE-specific PDSCH MAC CE (second MAC CE, enhanced PDSCH TCI MAC CE)" for the serving cell, i.e., applicability of the MAC CE, presents a problem.

The UE may conform to one of the following options 2-1a to 2-1d.

[Option 2-1a]

When a serving cell configured with the multi TRP based on the single DCI is configured in the CC list, the UE does not assume reception of the "Enhanced TCI States Activation/Deactivation for UE-specific PDSCH MAC CE" for the serving cell.

[Option 2-1b]

When a serving cell configured with the multi TRP based on the single DCI is configured in the CC list, the UE may assume reception of the "Enhanced TCI States Activation/Deactivation for UE-specific PDSCH MAC CE" for the serving cell.

When the UE receives the "Enhanced TCI States Activation/Deactivation for UE-specific PDSCH MAC CE", the MAC CE may be applied only to the serving cell. In this case, the MAC CE need not be applied to serving cells other than the serving cell.

[Option 2-1c]

When a serving cell configured with the multi TRP based on the single DCI is configured in the CC list, the UE may assume reception of the "Enhanced TCI States Activation/Deactivation for UE-specific PDSCH MAC CE" for the serving cell.

When the UE receives the "Enhanced TCI States Activation/Deactivation for UE-specific PDSCH MAC CE", the MAC CE may be applied to (one or more) serving cells configured with the multi TRP based on the single DCI in the CC list. In this case, the MAC CE need not be applied to serving cells of single TRP transmission in the CC list.

[Option 2-1d]

When a serving cell configured with the multi TRP based on the single DCI is configured in the CC list, the UE may assume reception of the "Enhanced TCI States Activation/Deactivation for UE-specific PDSCH MAC CE" for the serving cell.

When the UE receives the "Enhanced TCI States Activation/Deactivation for UE-specific PDSCH MAC CE", the MAC CE may be applied to all of the serving cells in the CC list. All of the serving cells in the CC list may include a serving cell of the multi TRP based on the single DCI and a serving cell of single TRP transmission.

When the "Enhanced TCI States Activation/Deactivation for UE-specific PDSCH MAC CE" is applied to a cell of single TRP transmission (not the multi TRP based on the single DCI) and the TCI code point in the DCI corresponds to two TCI states, only one of a fixed first TCI state and a fixed second TCI state indicated by the TCI code point may be applied.

<<Problem 2-2>>

It is certain that, when a serving cell configured with the multi TRP based on the single DCI is configured in the CC list, the UE can receive the "TCI States Activation/Deactivation for UE-specific PDSCH MAC CE (first MAC CE, PDSCH TCI MAC CE)" for simultaneous TCI update across a plurality of CCs. However, what the applicability of the "TCI States Activation/Deactivation for UE-specific PDSCH MAC CE" for simultaneous DCI update across a plurality of CCs is presents a problem.

The UE may conform to one of the following options 2-2a to 2-2c.

[Option 2-2a]

The "TCI States Activation/Deactivation for UE-specific PDSCH MAC CE" may be transmitted to any serving cell in the CC list.

When the MAC CE is transmitted to one serving cell in the CC list, the MAC CE may be applied to all of the serving cells in the CC list.

[Option 2-2b]

The "TCI States Activation/Deactivation for UE-specific PDSCH MAC CE" may be transmitted only to the serving cell configured with single TRP transmission in the CC list. The MAC CE need not be transmitted to the serving cell configured with the multi TRP based on the single DCI in the CC list.

When the MAC CE is transmitted to the serving cell configured with single TRP transmission in the CC list, the MAC CE may be applied to all of the serving cells in the CC list. All of the serving cells in the CC list may include a serving cell of the multi TRP based on the single DCI and a serving cell of single TRP transmission.

[Option 2-2c]

The "TCI States Activation/Deactivation for UE-specific PDSCH MAC CE" may be transmitted only to the serving cell configured with single TRP transmission in the CC list.

The MAC CE need not be transmitted to the serving cell configured with the multi TRP based on the single DCI in the CC list.

When the MAC CE is transmitted to the serving cell configured with single TRP transmission in the CC list, the MAC CE may be applied to one or more serving cells configured with single TRP transmission in the CC list. In this case, the MAC CE need not be applied to the serving cell configured with the multi TRP based on the single DCI in the CC list.

<<Variations>>

In option 2-2a/2-2b, the "TCI States Activation/Deactivation for UE-specific PDSCH MAC CE" may be applied to the serving cell configured with the multi TRP based on the single DCI. In this case, the serving cell configured with multi TRP transmission based on the single DCI may be restricted to operate in a single TRP transmission mode.

One of options 2-1a to 2-1d and one of options 2-2a to 2-2c may be combined.

For example, a combination of option 2-1c and option 2-2b may be applied. For example, a combination of option 2-1a and option 2-2b may be applied. For example, a combination of option 2-1a and option 2-2c may be applied. Other combinations may be applied.

According to the second embodiment described above, simultaneous TCI update across a plurality of CCs is appropriately performed.

Other Embodiments

A higher layer parameter (RRC information element) corresponding to any function of the first and second embodiments may be defined. When the higher layer parameter is configured, the UE may perform the corresponding function.

A UE capability corresponding to any function of the first and second embodiments may be defined. The UE capability may indicate that the UE supports the function. When the UE reports the UE capability, the UE may perform the corresponding function. When the UE reports the UE capability and a corresponding higher layer parameter is configured, the UE may perform the function.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
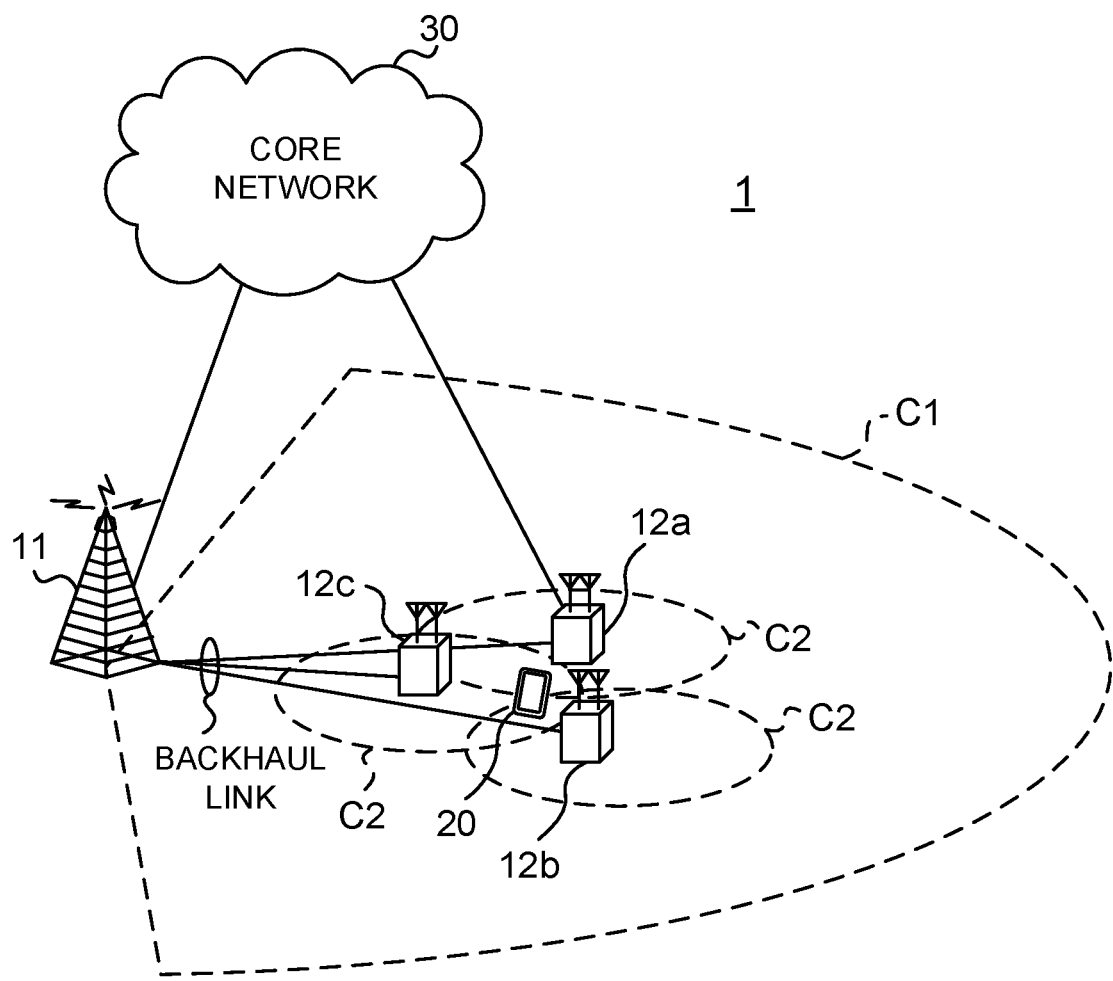
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
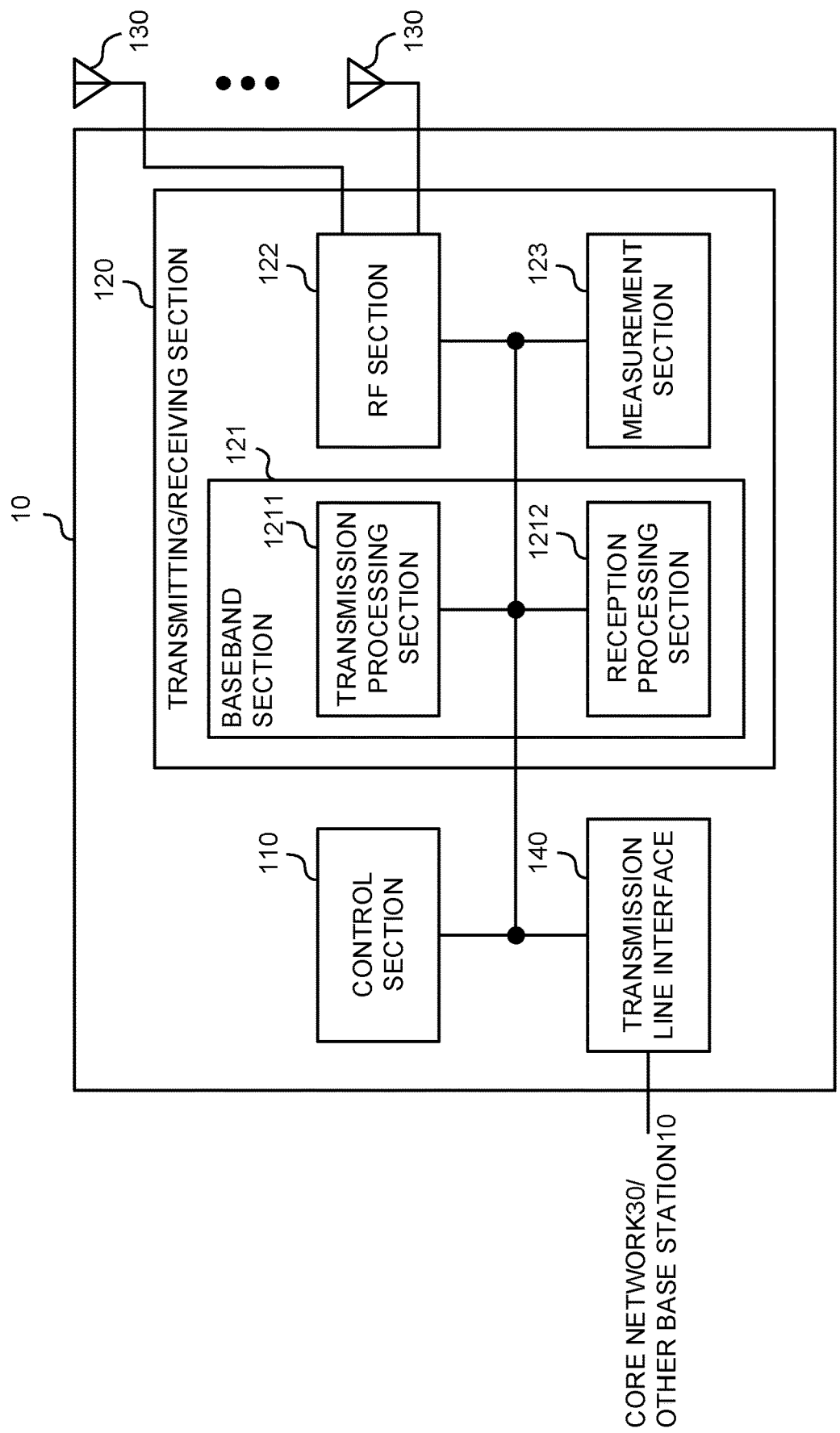
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a list of a plurality of serving cells, and transmit a medium access control-control element (MAC CE) used for activation of a TCI state for a physical downlink shared channel to one serving cell of the plurality of serving cells. When the plurality of serving cells include one or more specific serving cells in which at least one transmission configuration indication (TCI) code point is mapped to two transmission configuration indication (TCI) states, the control section 110 may map one or more TCI state IDs indicated by the MAC CE to the TCI code point of one or more serving cells of the plurality of serving cells.

(User Terminal)

Figure 8:
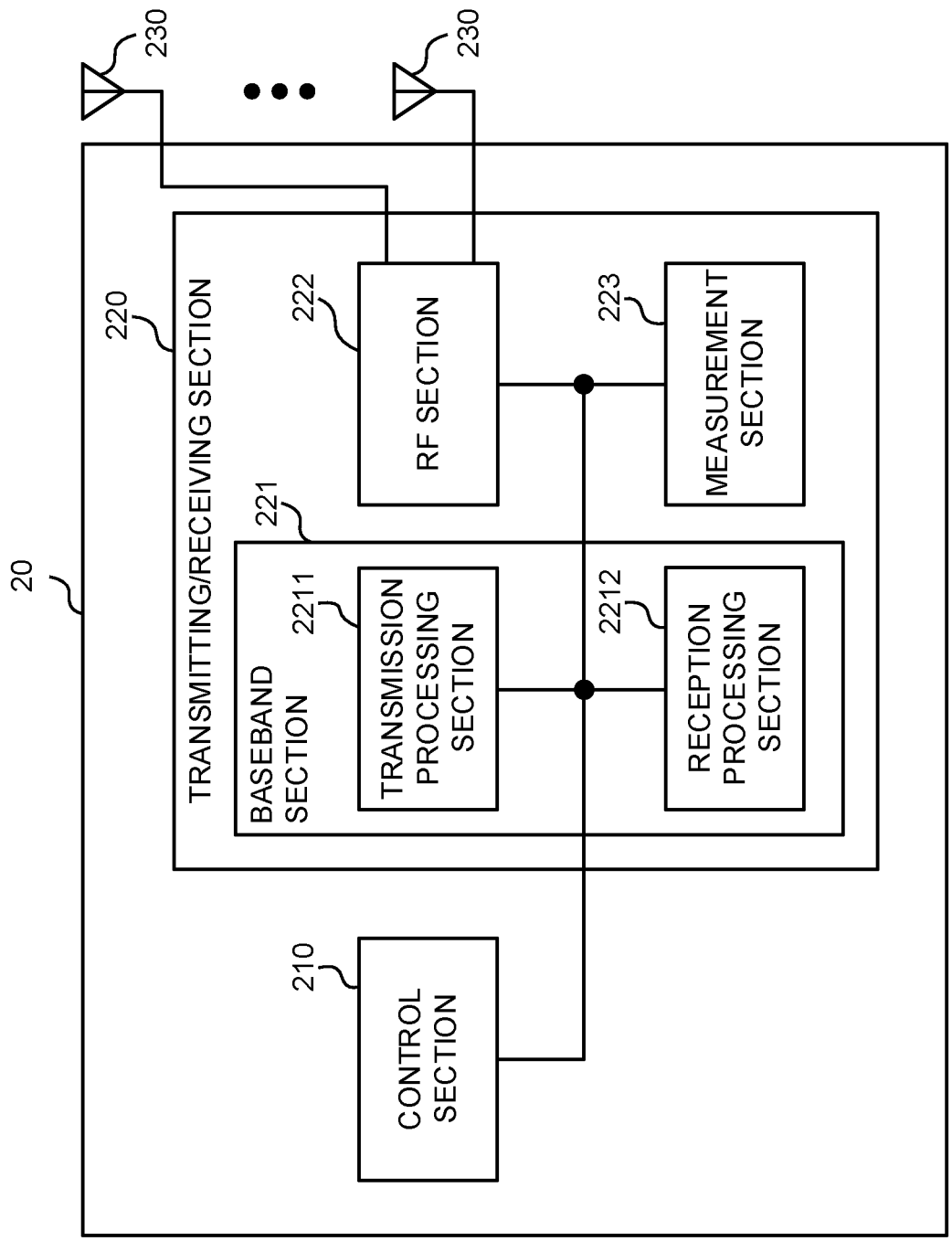
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a list of a plurality of serving cells, and receive, for one serving cell of the plurality of serving cells, a medium access control-control element (MAC CE) used for activation of a TCI state for a physical downlink shared channel. When the plurality of serving cells include one or more specific serving cells in which at least one transmission configuration indication (TCI) code point is mapped to two transmission configuration indication (TCI) states, the control section 210 may map one or more TCI state IDs indicated by the MAC CE to the TCI code point of one or more serving cells of the plurality of serving cells.

The one or more serving cells may be one of the plurality of serving cells, the one serving cell included in the one or more specific serving cells, the one or more specific serving cells, and a cell other than the one or more specific serving cells of the plurality of serving cells.

The MAC CE may include a field indicating whether two TCI state IDs for one TCI code point are included.

The MAC CE may include a control resource set pool ID.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
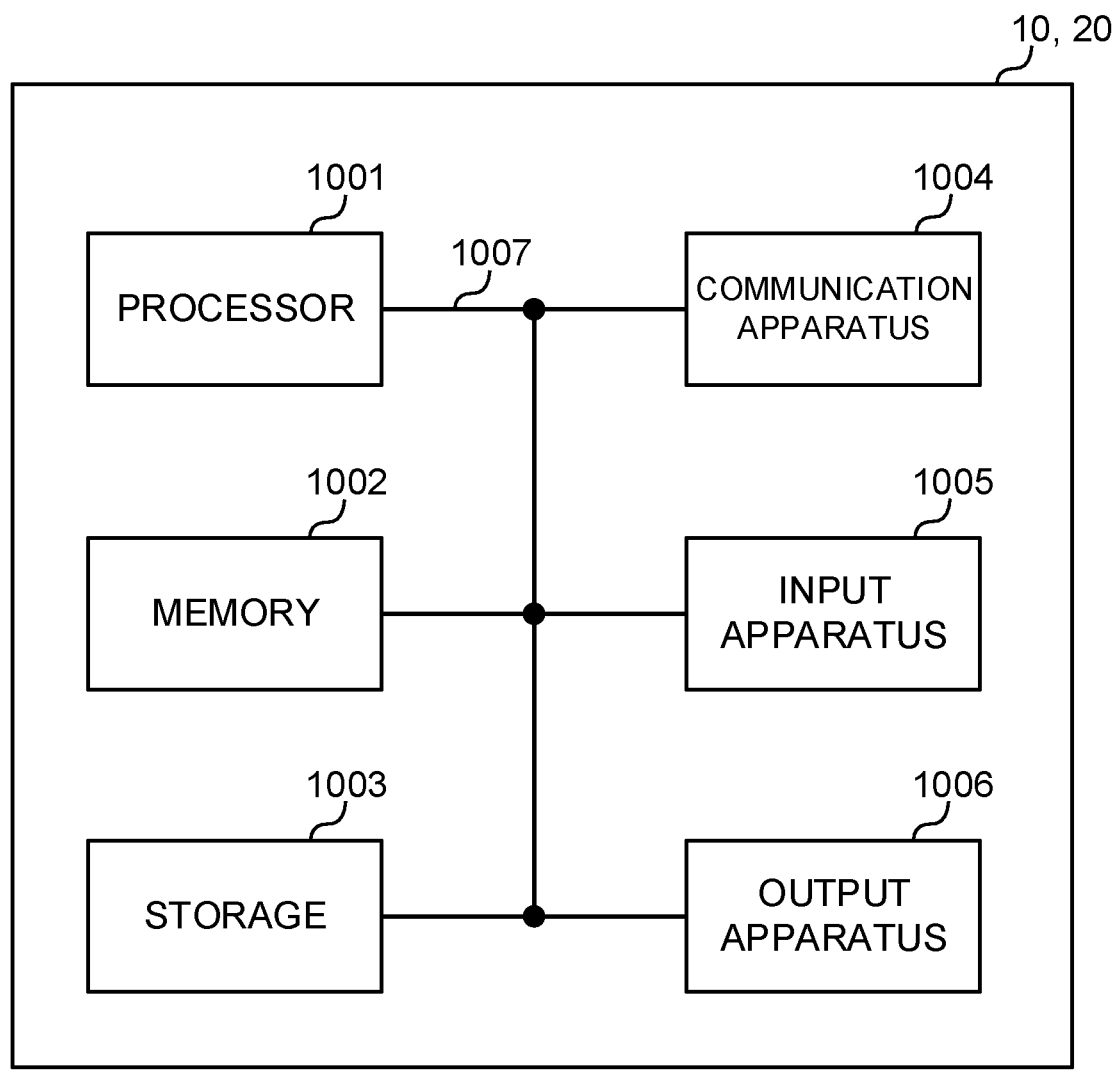
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2020-138092 filed on Aug. 18, 2020, the entire contents of which are incorporated herein by reference.

What is claimed is:

1. A terminal comprising:
a transmitter that transmits capability information indicating that the terminal supports a Medium Access Control-Control Element (MAC CE) for a first serving cell configured with a single Downlink Control Information (DCI) based multi-Transmission/Reception Point (TRP), the MAC CE activating two Transmission Control Indication (TCI) states per TCI codepoint of a DCI field, being applied to a plurality of serving cells including the first serving cell and a second serving cell configured with a single TRP;
a receiver that receives a list of the plurality of serving cells and the MAC CE; and
a processor that applies the MAC CE to all of the plurality of serving cells,
wherein the TCI codepoint corresponds to the two TCI states.

2. The terminal according to claim 1, wherein when the MAC CE is applied to a serving cell, among the plurality of serving cells, configured with a single TRP and when a TCI codepoint of a DCI field corresponds to two TCI states, the processor applies one of the two TCI states.

3. A radio communication method for a terminal, comprising:
transmitting capability information indicating that the terminal supports a Medium Access Control-Control Element (MAC CE) for a first serving cell configured with a single Downlink Control Information (DCI) based multi-Transmission/Reception Point (TRP), the MAC CE activating two Transmission Control Indication (TCI) states per TCI codepoint of a DCI field, being applied to a plurality of serving cells including the first serving cell and a second serving cell configured with a single TRP;
receiving a list of the plurality of serving cells and the MAC CE; and
applying the MAC CE to all of the plurality of serving cells,
wherein the TCI codepoint corresponds to the two TCI states.

4. A base station comprising:
a receiver that receives capability information indicating that a terminal supports a Medium Access Control-Control Element (MAC CE) for a first serving cell configured with a single Downlink Control Information (DCI) based multi-Transmission/Reception Point (TRP), the MAC CE activating two Transmission Control Indication (TCI) states per TCI codepoint of a DCI field, being applied to a plurality of serving cells including the first serving cell and a second serving cell configured with a single TRP;
a transmitter that transmits a list of the plurality of serving cells and the MAC CE; and
a processor that indicates, by transmitting the MAC CE, that the MAC CE is applied to all of the plurality of serving cells,
wherein the TCI codepoint corresponds to the two TCI states.

5. A system comprising a terminal and a base station, wherein
the terminal comprises:
a transmitter that transmits capability information indicating that the terminal supports a Medium Access Control-Control Element (MAC CE) for a first serving cell configured with a single Downlink Control Information (DCI) based multi-Transmission/Reception Point (TRP), the MAC CE activating two Transmission Control Indication (TCI) states per TCI codepoint of a DCI field, being applied to a plurality of serving cells including the first serving cell and a second serving cell configured with a single TRP;
a receiver that receives a list of the plurality of serving cells and the MAC CE; and a processor that applies the MAC CE to all of the plurality of serving cells,
wherein the TCI codepoint corresponds to the two TCI states, and
the base station comprises:
a transmitter that transmits the list of the plurality of serving cells and the MAC CE.

\* \* \* \* \*